Patented Nov. 18, 1924.

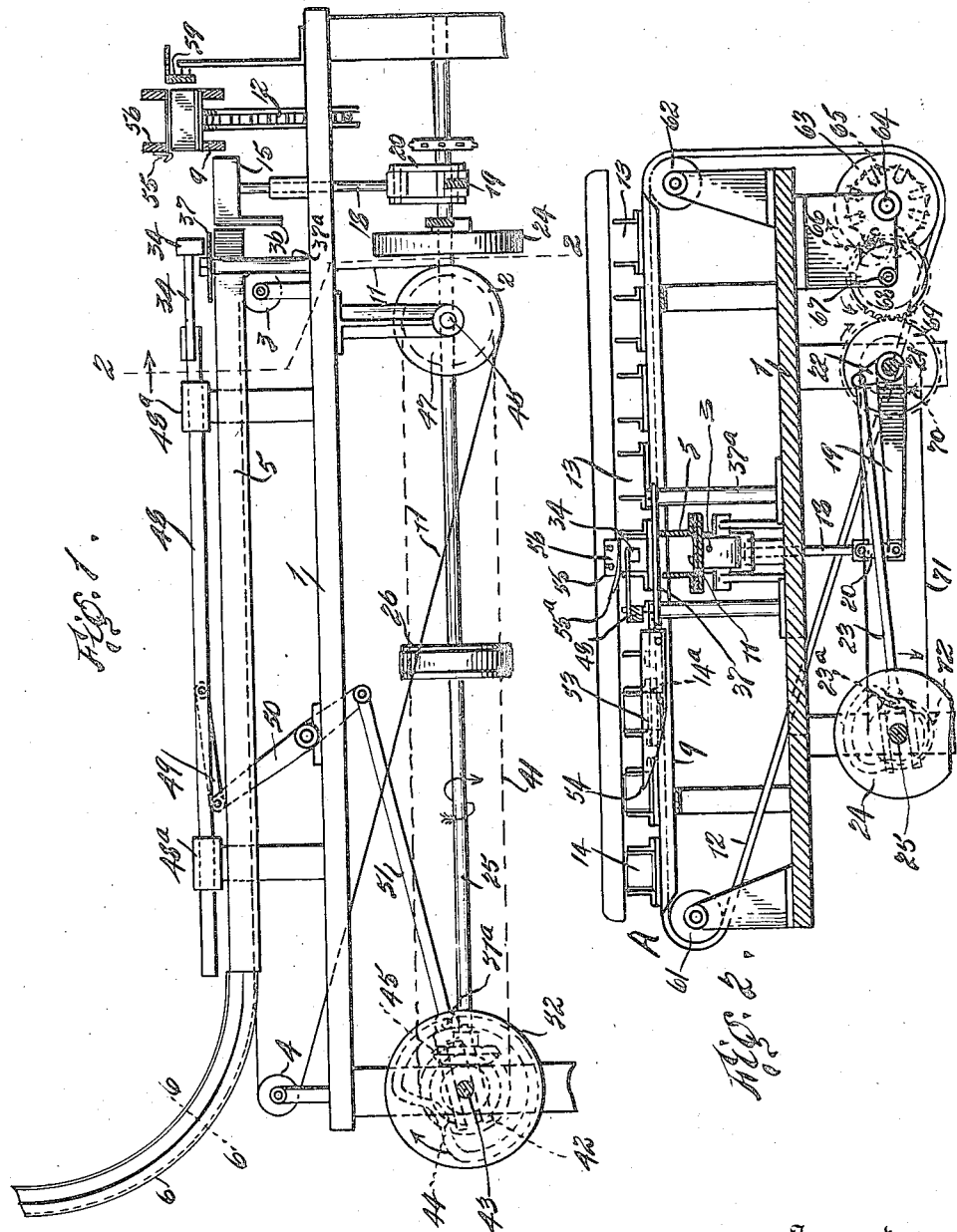

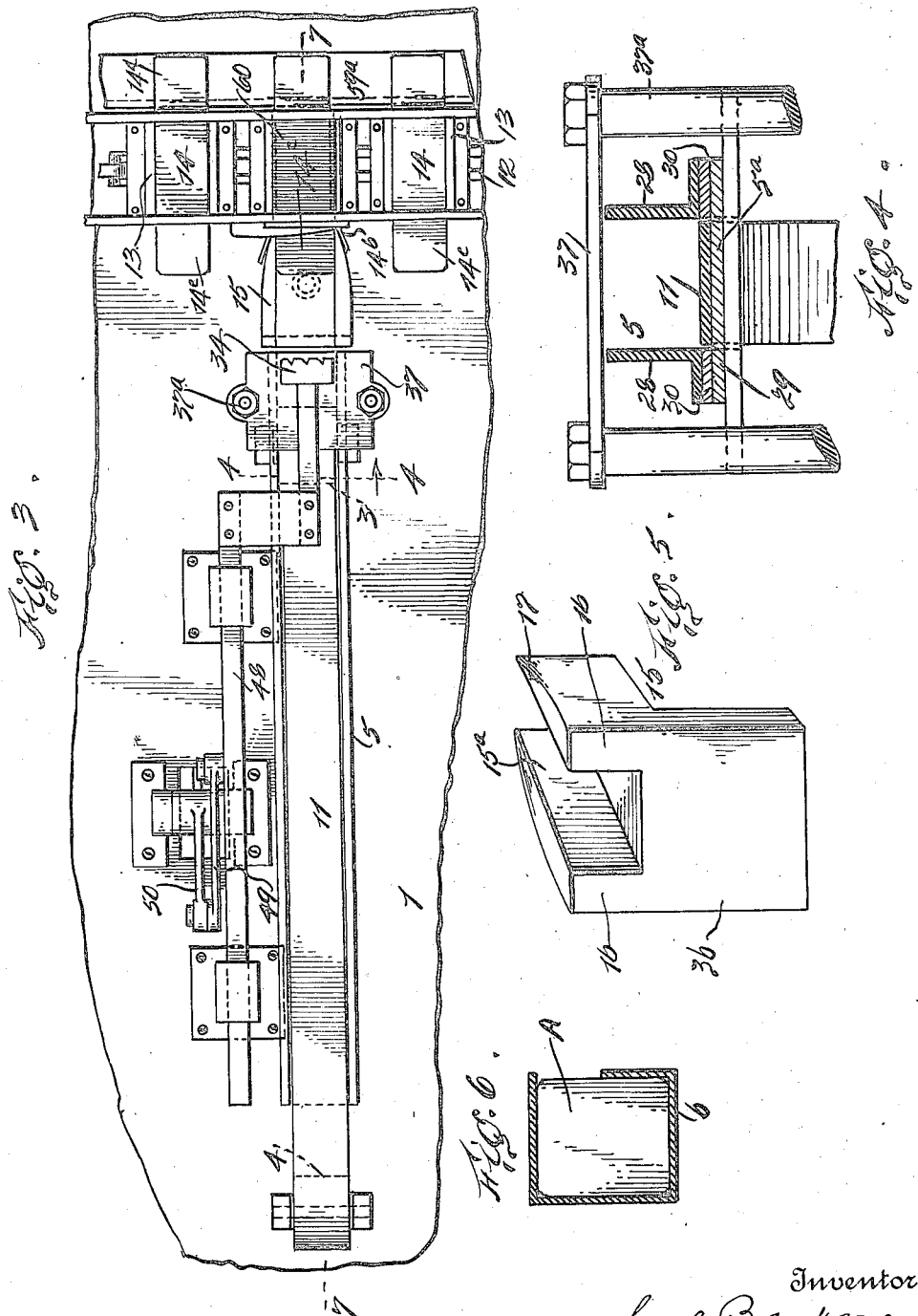

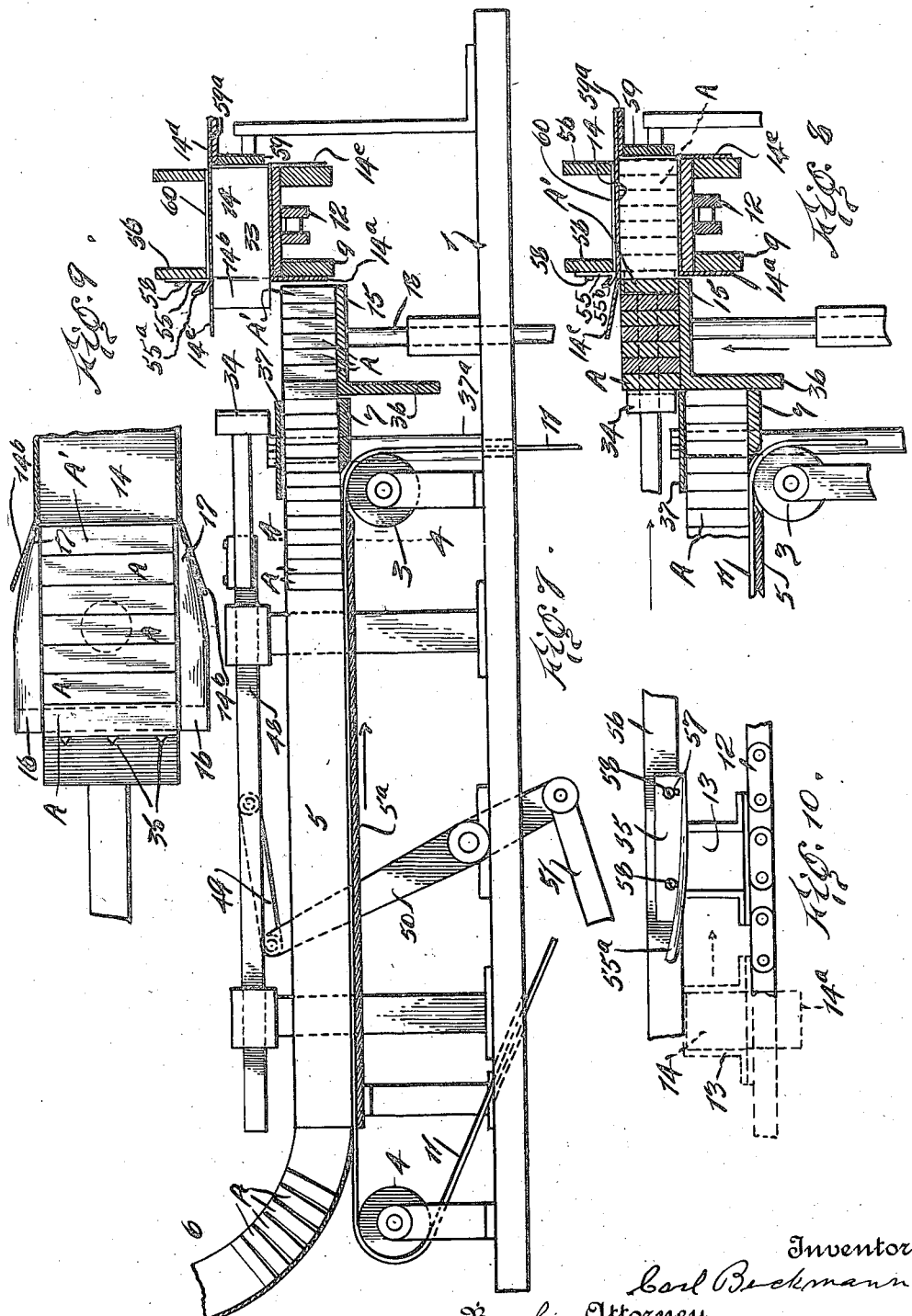

1,515,589

UNITED STATES PATENT OFFICE.

CARL BECKMANN, OF NEW YORK, N. Y., ASSIGNOR TO E. D. ANDERSON, INC., OF NEW YORK, N. Y., A CORPORATION OF NEW YORK.

PACKAGING MACHINE.

Application filed January 14, 1921. Serial No. 437,306.

*To all whom it may concern:*

Be it known that I, CARL BECKMANN, a citizen of Germany, and resident of New York city, in the county of Queens and State of New York, have invented certain new and useful Improvements in Packaging Machines, of which the following is a specification.

This invention relates to machines for automatically charging receptacles or cartons with articles of merchandise.

One of the objects of the invention is to enable a plurality of articles to be charged simultaneously into a receptacle in a single operation. Such articles are selected from a continuously fed supply thereof in a successive manner for succeeding receptacles that are fed step by step with relation to the charging devices.

Other objects and features of improvement comprised in this invention will be more fully hereinafter set forth and then pointed out in the claims.

Reference is to be had to the accompanying drawings forming part hereof, wherein—

Fig. 1 is a partly sectional side view of a machine embodying this invention; Fig. 2 is a cross section substantially on line 2, 2 in Fig. 1; Fig. 3 is an enlarged fragmentary plan view; Fig. 4 is an enlarged detail cross section on line 4, 4 in Fig. 3; Fig. 5 is an enlarged detail perspective view of the transferrer for the articles; Fig. 6 is an enlarged cross section on line 6, 6 in Fig. 1; Fig. 7 is an enlarged longitudinal section on line 7, 7 in Fig. 3; Fig. 8 is a detail sectional view illustrating the transferrer in the article delivery position; Fig. 9 is an enlarged detail plan view; and Fig. 10 is an enlarged detail side view of the conveyer for the receptacles.

Similar numerals of reference indicate corresponding parts in the several views.

The frame of the machine is indicated generally at 1 and which may be of any suitable construction. A conveyer 11 is shown in the form of a belt and passes over pulleys or rollers 2, 3, and 4 suitably journaled in the main frame, the upper run of which conveyer travels toward a conveyer 12 which is supported to operate substantially at right angles to the plane of conveyer 11. The conveyer 12 is provided with spaced receivers 13 to receive receptacles or cartons 14 to be charged (Fig. 2). The receptacles or cartons may be deposited in the receivers 13 by hand operation or by any suitable mechanism known in the art. The receptacles may be deposited in the receivers in an open condition or may be placed in the receivers in a closed condition and opened in the receivers by any suitable or well known mechanism. The upper run of conveyer 11 travels through a guideway 5 supported by the main frame adapted to receive the articles A to be packed in the receptacles, the upper run of conveyer 11 traveling over the bottom 5ª of guideway 5 to cause the articles to be continuously fed toward conveyer 12. The articles A may be supplied to guideway 5 in any suitable manner such as by means of a chute 6 into which the articles may be deposited manually or by any suitable feeding mechanism known in the art. Between the delivery end of guideway 5 and the conveyer 12 a transferrer or elevator 15 for the articles A is located. The conveyer 12 is shown on a plane higher than the conveyer 11 and guideway 5, and the transferrer 15 is adapted to reciprocate to elevate a certain number of articles A from the plane of conveyer 11 to a position opposite the receptacles 14 on conveyer 12, (Figs. 7 and 8). The transferrer 15 is shown having spaced sides 16 providing a channel 15ª to receive the articles A (Fig. 5). The outer faces of the sides 16 of the transferrer are rounded or tapered as at 17, (Figs. 5 and 9), to conveniently enter between the projecting side flaps 14ᵇ of receptacles 14 to spread said flaps as the transferrer rises with the articles A, (Fig. 9). The side walls of transferrer 15 are also shown tapering or beveled toward their ourter ends. Transferrer 15 is shown carried by a vertically movable rod 18 guided in suitable bearings on the main frame, and pivotally connected by links 20, (Fig. 1) with an arm 19 journaled upon shaft 21 supported in bearings on the main frame, (Fig. 2). Arm 19 is provided with an arm 22 pivotally connected with rod or link 23 shown having a forked end guided by shaft 25 journaled on the main frame.

Shaft 25 is shown provided with a cam 24 cooperative with projection 23ª on rod 23, whereby said rod will be reciprocated to cause reciprocation of transferrer 15. Shaft 25 may be rotated by means of pulley 26 receiving a belt from any suitable power source. In its lowered position the transferrer 15 is on a level with the conveyer belt 11 to receive articles A therefrom. A wall 7 supported between the conveyer 11 and transferrer 15 serves as a continuation of guideway 5 to guide the articles from the conveyer to the transferrer. When the articles A are propelled by conveyer 11 upon transferrer 15 said articles will be stopped by the turned down flap 14ª of receptacle 14, Fig. 7. Conveyer 12 is to be operated step by step so that at each stop of the conveyer a receptacle 14 will be presented in position at one side of transferrer 15 when the latter is raised from the article receiving position of Fig. 7 to the article delivery position of Fig. 8. As illustrated, the transferrer 15 is adapted to receive seven articles A from each charge for a receptacle, although the parts may be arranged to receive any desired number of such articles for a charge. To prevent articles A in guideway 5 from being raised when the transferrer rises with a series of articles, a stop 37 is located over the delivery end of guideway 5, which stop is shown as a plate carried by posts 37ª secured on the main frame, the forward end of the stop being in position retracted from the path of the transferrer 15 to prevent interference with articles A thereon, (Fig. 8).

When transferrer 15 has raised articles A into register with a receptacle on conveyer 12 a plunger or pusher 34 will move forward and push said articles from the transferrer into the receptacle, the articles being illustrated in the receptacle in dotted lines in Fig. 8. The operating end of plunger 34 is shown provided with grooves 35 for the entrance of air to break any vacuum that might arise between the plunger and the adjacent article A to prevent withdrawal of such article from the receptacle when the plunger recedes. Since the conveyer 11 operates continuously to feed the articles A forwardly toward the transferrer the latter is provided with a depending stop 36 adapted to oppose the articles in guideway 5 when the transferrer rises to restrict movement of said articles by conveyer 11 when the transferrer is not in article receiving position, (Fig. 8). When the transferrer has been sufficiently lowered and stop 36 has been depressed the articles A at the end of the guideway will be forced upon the transferrer to be elevated, and so on each time the transferrer is raised and lowered. The transferrer comes to rest in its lowered position for a sufficient period to receive a charge of articles A for every operation.

The conveyer 11 is shown operated continuously by means of a chain 41 passing over sprocket wheel 42 on shaft 43 journaled on the main frame and provided with gear 44 in a mesh with gear 45 on shaft 25, said chain also passing over sprocket 47 carried by shaft 46 journaled on the main frame and supporting pulley 2. The conveyer 12 is operated step by step and brought to rest for each corresponding reciprocation of transferrer 15 and plunger 34. Each time conveyer 12 comes to rest the transferrer 15 is elevated and plunger 34 is advanced to push the articles from the transferrer into the receptacle 14 on conveyer 12. Said plunger is carried by a slidable bar 48 guided in bearings 48ª on the main frame and pivotally connected by a link 49 with a rock arm 50 journaled on the main frame. Rock arm 50 is pivotally connected with rod 51 shown provided with a forked end guided upon shaft 43 and having a projection 51ª cooperative with a cam 52 on shaft 43. As said cam is rotated the plunger 34 will be reciprocated in proper timing respecting the operation of conveyer 12 and transferrer 15

In order to depress the lowermost flaps 14ª of the receptacles 14 out of the path of the articles A on transferrer 15, when conveyer 12 brings the receptacles to rest in charging position, a guide 53 is secured upon a support 9, adjacent to conveyer 12 which guide is shown provided with a lower inclined edge 54 (Fig. 2) adapted to engage the flaps 14ª as the receptacles are carried along with conveyer 12. Said guide 53 serves to turn the flaps 14ª down against support 9 before the receptacles are brought to rest in charging position adjacent to transferrer 15, so that when the articles A are pushed by plunger 34 upon transferrer 15 said articles will not interfere with the flaps 14ª. The side flaps 14ᵇ of the receptacles will be spread by the transferrer 15 as the latter rises with a charge of articles A.

To prevent articles A from falling back upon transferrer 15 out of a receiver 13 of conveyor 12 in the event that such receiver has not been charged with a receptacle or carton, a movable guard 55 is supported upon rail 56 over the charging position, Figs. 8 and 10, adapted normally to descend in front of the open end of receiver 13 and to be raised by receptacle 14 as the latter is carried along by conveyor 12. The guard 55 is shown provided with an inclined end portion 55ª (Fig. 10), to engage the receptacle or its upper flap to raise said guard to permit entrance of articles A into the receptacle. Guard 55 is provided with slots 57 receiving screws 58 carried by rail 56, whereby said guard is guided for vertical movement. The edge portion of guard 55 is shown extended upwardly and outwardly at 55ᵇ (Fig. 8), whereby when the guard is in its lower position the endmost article A' on elevator 15 may pass under said guard and raise it in case a receptacle 14 is not in a receiver of conveyer 12. When the receiver has been charged in the manner last stated, and the plunger 34 recedes, the guard 55 will descend to prevent articles A from falling out of the receiver upon the transferrer. At the end of receptacle 14 opposite the transferrer a guard rail 59 is supported on the main frame, to prevent article A from falling out of the receiver 13 or the receptacle 14 therein. The upper lateral portion 59$^a$ of guard rail 59 serves to guide adjacent flaps 14$^d$ of receptacles 14 as they are carried along with conveyer 12. A guide similar to guide 53 may be located on the side of conveyer 12 opposite the guard 53 to cause the lower flaps 14$^e$ to be turned down as the receptacles travel with the conveyer. The rails 56 over the conveyer keep the receptacles 14 from rising therein.

To prevent the endmost article A' of a stack of articles on transferrer 15 from falling over while being pushed into a receptacle 14 a pressure plate 60 is located over the receptacles in the conveyer to create inward pressure upon the upper walls of the receptacles when the latter come to rest in charging position.

The conveyer 12 may be operated step by step in any desired manner. In the accompanying drawings a Geneva movement is illustrated for operating the conveyer. Said conveyer is shown supported by idle pulleys 61, 62, and passing over a drive pulley (Fig. 2), or sprocket 63 on shaft 64, supported by the main frame. Upon shaft 64 is the slotted member 65 of the Geneva movement adapted to receive a projection 66 carried by a shaft 67, supported by the main frame and provided with a gear 68 in mesh with a gear 69 secured on shaft 21 (Fig. 2). Shaft 21 is provided with a pulley 70 receiving belt 71 from a pulley 72 on shaft 25. The gearing described will cause the Geneva member 65 to rotate intermittently for operating conveyer 12 step by step, in accordance with reciprocations of transferrer 15 and plunger 34.

The operation may be described as follows:—

The articles A are supplied continuously upon conveyer 11, and the receptacles 14 are supplied successively to the receivers of conveyer 12. When conveyer 12 comes to rest with a receptacle in charging position the transferrer 15 will be in the depressed position, and supplied with articles A from conveyer 11, the plunger 34 being retracted, (Fig. 7). While conveyer 12 is stationary the transferrer 15 will rise to present a charge of articles A opposite receptacle 14 on conveyer 12, and plunger 34 will advance to push said articles into the receptacle. Transferrer 15 will descend to receive another charge of articles A, plunger 34 will recede from over the transferrer, and conveyer 12 will operate a step to carry the charged receptacle from the charging position and present another open receptacle in such position. The described operations will be repeated for the successive receptacles to be charged.

Changes may be made in the details of construction set forth within the scope of the appended claims, without departing from the spirit of the invention.

Having now described my invention what I claim is:

1. A packaging machine comprising means to feed articles, a transferrer to receive articles from said means and movable transversely with respect thereto, means to reciprocate the transferrer, a conveyer having means to retain open receptacles, means to support said conveyer with a receptacle on a plane different from the first named means, means to operate the conveyer step by step, a plunger opposing a receptacle on the conveyer in charging position, means to reciprocate said plunger over the transferrer and retract the plunger out of register with the transferrer, a guide in the path of lower flaps of the receptacles to turn said flaps out of the path of the transferrer, and a movable guard located over the charging position of the receptacles adapted to be raised by the latter, said guard having means to be engaged by the articles on the transferrer to permit transfer of the same to the conveyer and oppose the escape of an article on the conveyer.

2. A packaging machine comprising means to continuously feed articles, a conveyer having receivers for receptacles, means to operate said conveyer step by step, a transferrer reciprocative between said means and said conveyer, means to actuate said transferrer, said transferrer having a channel for articles and provided with inclined sides to spread flaps of receptacles on the conveyer, a plunger operative over the transferrer to charge articles therefrom into receptacles on the conveyer and means to reciprocate said plunger.

Signed at New York in the county of Queens and State of New York this 7th day of January A. D. 1921.

CARL BECKMANN.